Dec. 2, 1930.   P. P. BEBRY   1,783,531
SLIDING SPIRAL SPRING BED
Filed Feb. 27, 1929   3 Sheets-Sheet 1
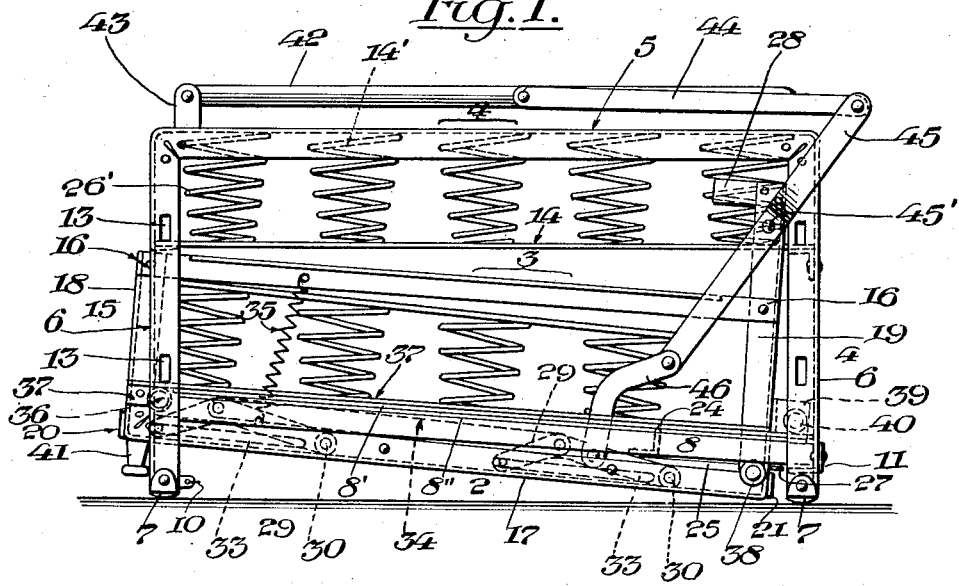
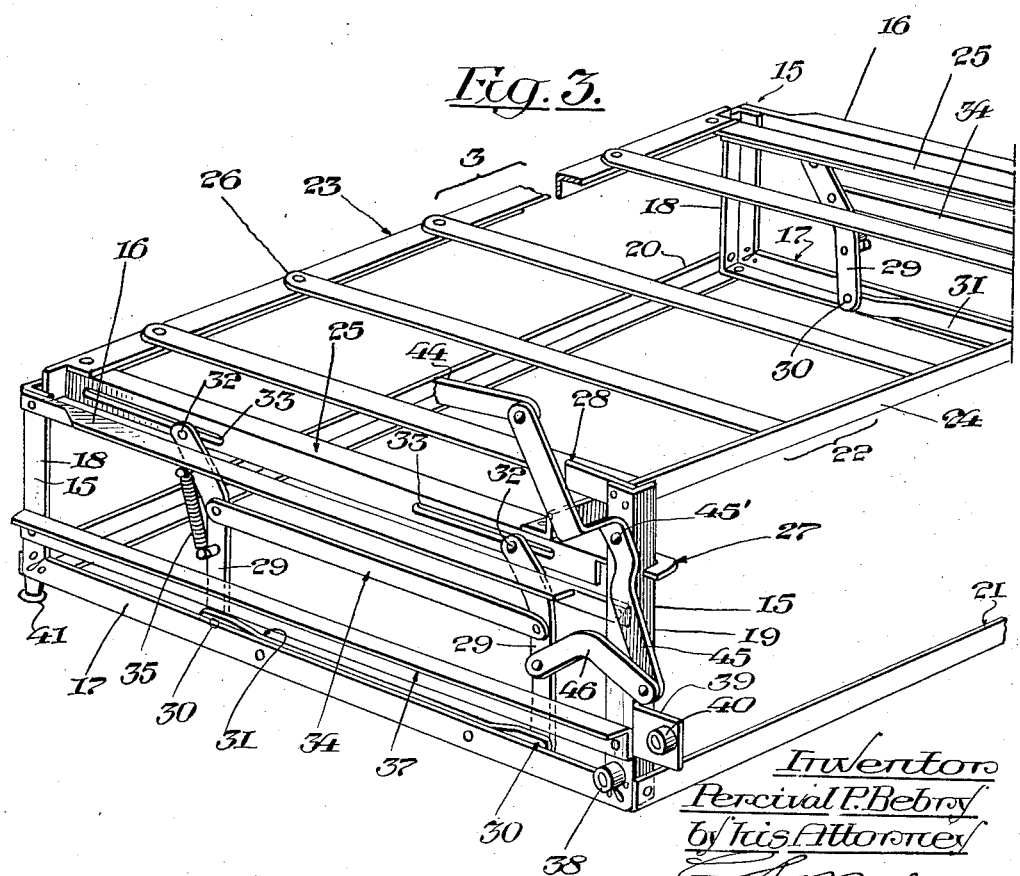

Dec. 2, 1930.  P. P. BEBRY  1,783,531
SLIDING SPIRAL SPRING BED
Filed Feb. 27, 1929  3 Sheets-Sheet 2
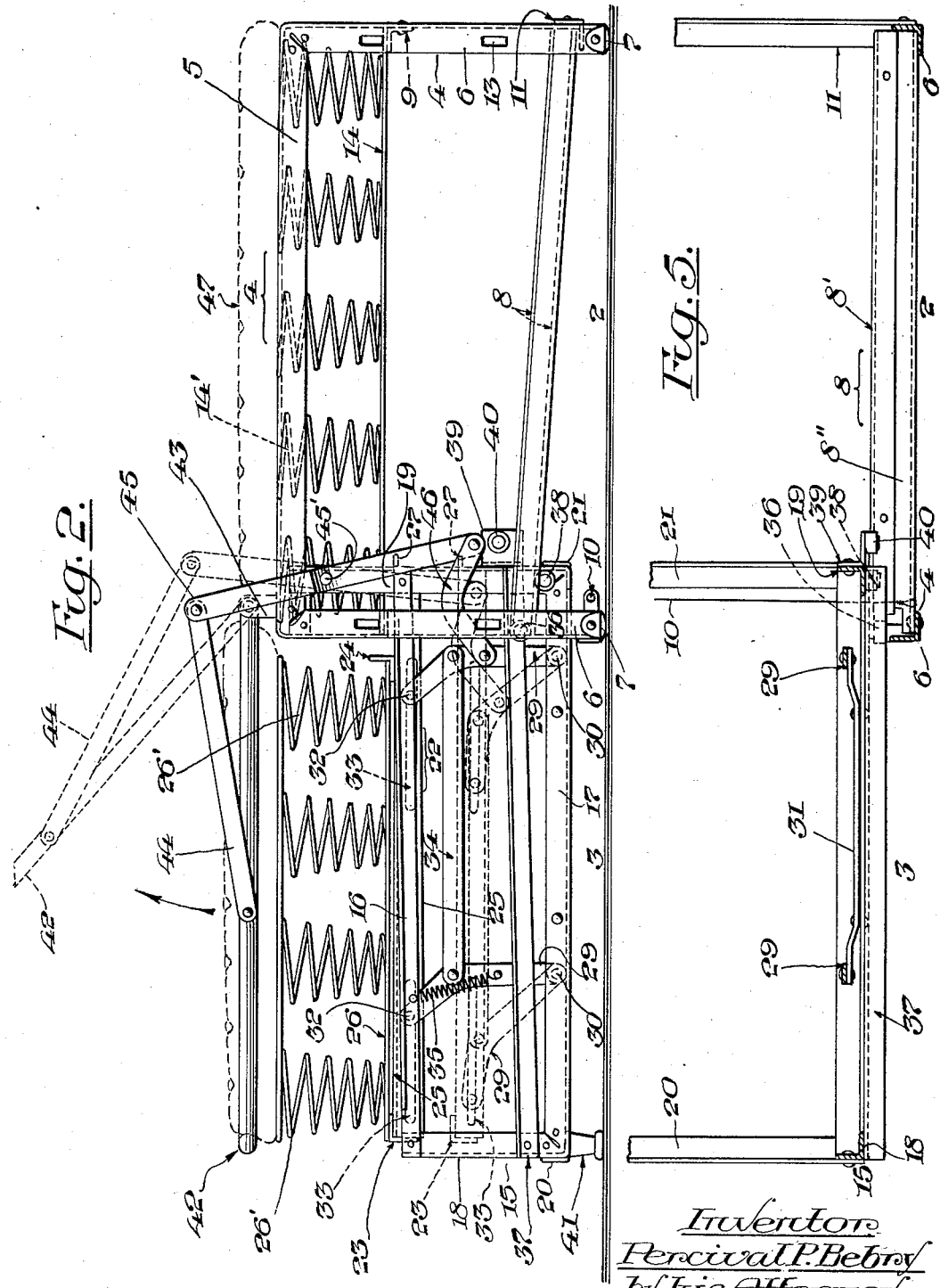

Dec. 2, 1930.　　　　P. P. BEBRY　　　　1,783,531
SLIDING SPIRAL SPRING BED
Filed Feb. 27, 1929　　　3 Sheets-Sheet 3
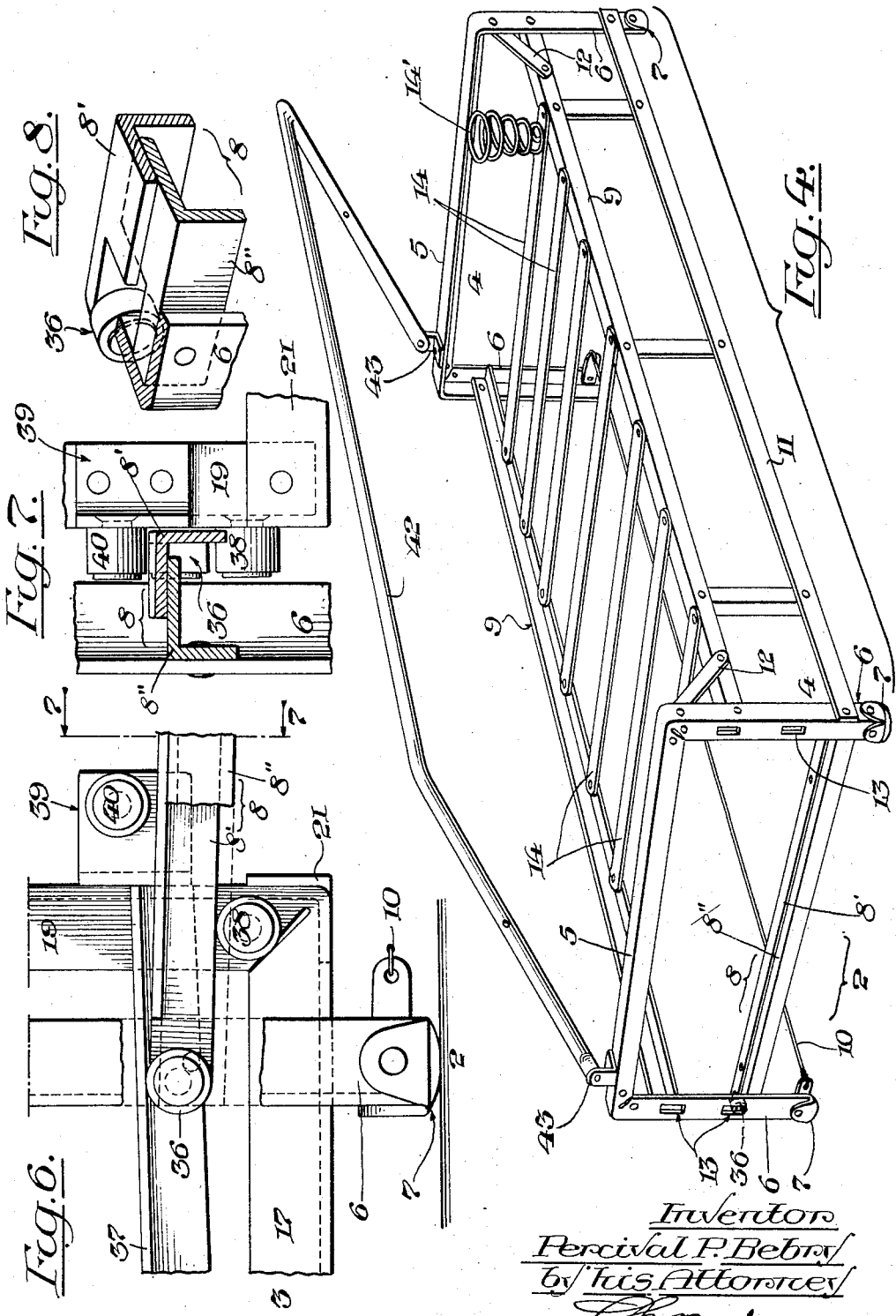

Patented Dec. 2, 1930

1,783,531

UNITED STATES PATENT OFFICE

PERCIVAL P. BEBRY, OF HYDE PARK, MASSACHUSETTS, ASSIGNOR TO ENGLANDER SPRING BED COMPANY, OF NEW YORK, N. Y., A CORPORATION OF NEW YORK

SLIDING SPIRAL-SPRING BED

Application filed February 27, 1929. Serial No. 343,201.

This invention relates to sliding couch beds or day-beds in which the mattress-supporting means is made up of nestable spiral springs, the object of the invention being to provide an improved sliding couch bed comprising a pair of nested beds or sections each having spiral mattress-supporting springs and one sliding relatively to the other, with means whereby the sliding section is prevented from engaging the floor during the sliding movement of the section but permitted to rest thereon when the sliding section is fully extended, thereby to prevent the marring, scratching, or injury of the floor and the rucking up or wrinkling of the floor covering or rug upon which the bed may rest or the compressing, setting, or injury of the surface or pile of such floor covering.

A further object of the invention is the provision of an improved sliding couch bed comprising a main section and a sliding section, the latter having a vertically-movable spring-supporting means, and which sections are provided with means automatically operative to maintain the sliding section off the floor during the sliding movement thereof and automatically lower and raise the same after the sliding section is fully extended.

Another object of the invention is the provision of an improved sliding couch bed having nestable spiral springs and provided with means for shifting the sliding section and with means co-operating therewith and so organized as to hold the sliding section off the floor during all of the sliding movements thereof and permit it to engage the floor when the sliding section is fully extended, and which shifting means is also operative to raise and lower the spiral springs of the sliding section when the sliding section is fully extended, thereby to permit them to nest under the spiral springs of the main section, and to also fold and unfold a sectional or book mattress; and which couch bed is simple in construction, durable in use, efficient in operation, comparatively inexpensive to manufacture, and by means of which the disadvantages of sliding couches as heretofore manufactured are entirely eliminated.

In the drawings accompanying and forming a part of this specification—

Figure 1 is an end view of the sliding couch bed in closed position;

Fig. 2 is an end view of the couch bed in open position;

Fig. 3 is a perspective view of the sliding section of the couch;

Fig. 4 is a perspective view of the main section of the couch;

Fig. 5 is a plan view of one end of the frames of the two sections with parts thereof in section;

Fig. 6 is a detail, enlarged view illustrating the inner corners of the two nested sections;

Fig. 7 is a cross-sectional view taken on line 7—7, Fig. 6; and

Fig. 8 is a detail, perspective view of the inner end of the track of the main section.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

One of the great disadvantages of sliding beds as heretofore constructed is that the sliding section has its feet or legs at the forward side thereof always resting upon the floor, so that the movement of the sliding section injured the floor when uncovered by scratching or marring it and when covered by rucking up or wrinkling the covering or rug and injuring the surface thereof by setting or compressing the pile, thus leaving the floor or rug with an unsightly appearance and this could not be prevented by the use of casters of any kind or other protective means since whatever was used necessarily scraped along the floor and marked the same, and many complaints had been made but heretofore no practicable way to avoid this serious disadvantage was discovered. In the present improvement, however, these disadvantages are eliminated by reason of the fact that the sliding section is always maintained with its legs or feet held off of and spaced from the floor during the entire sliding movement of the sliding section, but which legs, however, are permitted to engage the floor when the sliding section has been fully extended, thereby to take the weight of the bed and of the user, so that this serious disadvantage is no longer present in this improved form of sliding couch bed. The present improvement results in the provision of a couch bed in which the spiral springs of the two beds are not only maintained substantially level when the bed is extended and in which the extensible section is operated by the simple shifting of a lever which simultaneously throws a section of the mattress onto the sliding section or the main section, but in which the great advantage of operating the sliding section without injury to the floor or the covering thereof and without interference with the operation of the sliding section by the wrinkling or rucking up of the floor covering is made possible.

While this improvement may be adapted to various forms of beds having a sliding section, in the present instance it is shown as applied to a sliding couch bed having spiral springs, and in the preferred form thereof this improved couch bed comprises a main section 2 and a sliding section 3. The main section comprises a pair of end frames 4, shown constructed of angle iron, each comprising a top cross-bar 5 and a pair of depending legs 6 which may be provided with metal glides 7 or casters, as desired. The legs of each end frame are connected by a cross-brace in the form of a track 8 and the two end frames are connected by longitudinal side-bars 9 spaced a predetermined distance below the top cross-bars 5. The end frames are also connected by a tension-rod or wire 10 and a stiffening strap 11, the outer side-bar 9 being suitably braced by diagonal braces 12. The legs of the end frames are provided with suitable slots 13 for the attachment of ornamental heads, when desired. The side-bars are connected by cross-straps 14 for supporting suitable spiral springs 14' usually approximately five (5) inches in height. The sliding section 3 likewise comprises a pair of end frames 15, each comprising a top cross-bar 16, a bottom cross-bar 17, and a pair of end connecting bars 18 and 19, the latter projecting above the top cross-bar 16. These end frames are connected by longitudinal side-bars 20 and 21. Carried by the sliding section 3 is a vertically-shiftable supporting frame 22 comprising longitudinally-extending bars 23 and 24 and cross end-bars 25 and also cross-straps 26 for supporting suitable spiral springs 26'. The end-bars 25 of this spiral spring supporting frame are provided with hooked extensions 27 engaging the upright end-members 19, thereby forming guides for guiding the supporting frame 22 in its vertical movement. The end-members 19 are provided with projections 28 forming stops in position to engage the inner legs of the main section and thus limit the forward sliding movement of the sliding section.

The spiral spring supporting frame 22 of the sliding section is link-connected with the sliding section at each end by a pair of links 29 pivoted at their lower ends, as at 30, to a bar 31 riveted to the lower cross-bar 17 of the sliding section, and at their upper ends are provided with headed studs or pins 32 located in slots 33 carried by the cross end-bars 25 of the supporting frame 22. These links 29 are connected by a cross-link 34, and one of each pair of links 29 is connected with the top cross-bar 16 by a spiral spring 35 which facilitates the operation of the vertically-shiftable supporting frame 22.

The tracks 8 of the main section are inclinedly-located and each is provided at its forward end with a roll 36. These tracks are made up of a pair of angle-iron members 8' and 8'', one overlapping and riveted to the other, the member 8'' being in turn riveted to the legs 6. These rolls 36 are in position to engage under tracks 37 secured to the upright members 18 and 19 of the sliding section and likewise inclinedly-located but in the opposite direction to that of the tracks 8.

Most of the framework and tracks is preferably made of angle iron, the location of which is such as to give the proper rigidity and co-operation between the sections.

The upright members 19 of the sliding section are provided at their lower ends with rolls 38 in position to engage the under sides or edges of the tracks 8 of the main section, and the upright members 19 are also provided with projections or brackets 39 carrying rolls 40 in position to engage the upper sides of the tracks 8 during the sliding movement of the sliding section.

The sliding section may be provided with suitable foot rests or legs 41 at the forward side thereof. For shifting the sliding section and also the spiral spring supporting frame of the sliding section suitable means is provided, which, in the present instance, comprises an operating lever in the form of a U-shaped bar 42 pivotally connected at its inner ends to upright brackets 43 carried at the inner ends of the main section. This bar is link-connected at each end by a link 44 with a pivoted bar 45 pivotally connected as at 45', adjacent to the upper ends of the members 19 of the sliding section, the lower end of this bar 45 being in turn pivotally connected by a link 46 with one of the links 29 of the spiral spring supporting frame of the sliding section. By this means the sliding section is shifted outwardly or inwardly under the spiral springs of the main section, the spiral springs of the sliding section being vertically shifted by the same means so that they will either nest under the spiral springs of the main section when the sections are closed or will be raised so that they will be in substantially the same plane as the tops of the spiral springs of the main section. A folding or book mattress 47 has one section thereof resting upon the spiral springs of the main section, while the other section thereof is carried by the U-shaped operating bar, and consequently is either folded or unfolded according to the position of this bar.

In operation, with the sections nested in the manner shown in Fig. 1, when the operating bar is thrown to the left it operates through the link 44 and bar 45 and the pivot 45′ thereof to shift the sliding section outwardly, and this occurs before the bar 45 operates the links 29. When the sliding section has been shifted outwardly practically its entire distance, the operating bar is in the position A shown in Fig. 2, and by a continued downward movement this bar operates to shift the bars 45 on their pivots and thereby the links 46 and thereby the links 29 to raise them and thereby raise the spiral spring supporting frame of the sliding section into the position shown in Fig. 2 and at the same time carry one section of the folding mattress down on top thereof. When it is desired to close the structure, the operating bar 42 is raised to the position A (Fig. 2), during which time the spiral spring supporting frame is dropped or lowered into the sliding section and in readiness to be nested under the spiral springs of the main section, and a further continued movement of the operating bar 42 operates through the pivots 45′ to then shift the sliding section under the main section.

During these sliding movements, it will be observed, the rolls 36 of the main section engage under the tracks 37 of the sliding section, while the rolls 38 and 40 of the sliding section engage under and on top of, respectively, the tracks 8 of the main section, and by reason of the inclination of the tracks 8 the forward or front end of the sliding section is maintained spaced from the floor during the entire outward sliding movement thereof but permitted to engage the floor at the end of its forward sliding movement, thereby to take the weight of the sliding section and of the user thereof. In other words, during the outward sliding movement of the sliding section, the rolls 38 and 40 of the sliding section engage the under and top sides of the tracks 8 while the rolls 36 of the main section facilitate the sliding movement, the rolls 38 and 40 thus holding the sliding section off the floor until the sliding section reaches a predetermined point in its outward movement, whereupon the rolls 38 act as fulcrums to permit the forward side of the sliding section to move downward and engage the floor, at which time, of course, the rolls 40 are slightly clear of the tracks 8. When the sliding section is moved inward, the rolls 36 of the main section co-operating with the upwardly-inclined tracks 37 immediately lift the sliding section and thus bring the rolls 40 into engagement with the tracks 8, whereupon the sliding section can be readily shifted backward, the rolls 38 and 40 acting to guide the sliding section relatively to the tracks 8.

Thus it will be observed that during the forward sliding movement of the sliding section, the rolls 38 cooperating with the under sides of the upwardly-inclined tracks 8 maintain the sliding section off the floor, while on the inward sliding movement of the sliding section the rolls 36 likewise cooperating with the upwardly-inclined tracks 37 of the sliding section likewise raise and maintain the sliding section off the floor, the rolls 38 at this time engaging the under faces of the tracks 8 to insure the proper inward sliding movement of the sliding section, the rolls 40 at this time acting as guides to facilitate that movement. Thus during the outward sliding movement of the sliding section, the rolls 38 act to maintain the sliding section off the floor, by reason of the fact that they are always moving upward away from the floor; while on the reverse or inward sliding movement of the sliding section, the rolls 36 cause the sliding section to move upward by reason of the upward inclination of the tracts 37.

In practice the inclination of the tracks 8 and 37 is about the same and each has an inclination of about one and a half (1½) inches for its length, whereby the legs of the extensible section will be maintained away from the floor for approximately a quarter (¼) of an inch.

The rolls may be made of any suitable material, as metal or fiber, to give the best results.

Thus by the present improvement all danger of injuring or marring either the floor or the covering thereof or wrinkling it or rucking it up to prevent the proper and quick shifting of the sliding section, is entirely done away with.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a sliding couch bed, the combination of a main section, a sliding section, and a spring-supporting frame carried by said sliding section and shiftable relatively thereto, and means carried by said sections for maintaining the sliding section off the floor during the sliding movement thereof and effective to permit the sliding section to engage the floor when it is fully extended, said means including a pair of tracks carried by the sections and inclined in opposite directions.

2. In a sliding couch bed, the combination of a main section, a sliding section, and a spring-supporting frame carried by said sliding section and shiftable relatively thereto, means carried by said sections for maintaining the sliding section off the floor during the sliding movement thereof and effective to permit the sliding section to engage the floor when it is fully extended, said means including a pair of tracks carried by the sections and inclined in opposite directions, and rolls carried by the sections and co-operating with the tracks, some thereof co-operating with an inclined track to maintain the sliding section off the floor during the outward sliding movement thereof and some co-operating with another inclined track to maintain the sliding section off the floor during the inward sliding movement thereof.

3. In a sliding couch bed, the combination of a main section, a sliding section, and means carried by said sections for maintaining the sliding section off the floor during the sliding movement thereof and comprising oppositely-inclined tracks carried by said sections, and means carried by said sections and co-operating with said tracks.

4. In a sliding couch bed, the combination of a main section, a sliding section, and means carried by said sections for maintaining the sliding section off the floor during the sliding movement thereof and comprising oppositely-inclined tracks carried by said sections, and means carried by said sections and co-operating with said tracks, said last means comprising means carried by the sliding section and co-operating with the under side of an inclined track of the main section and means carried by the main section and co-operating with the under side of an inclined track of the sliding section.

5. In a sliding couch bed, the combination of a main section, a sliding section, and means carried by said sections for maintaining the sliding section off the floor during the sliding movement thereof and comprising oppositely-inclined tracks carried by said sections, and means carried by said sections and co-operating with said tracks, said last means comprising means carried by the sliding section and co-operating with the under side of an inclined track of the main section, means carried by the main section and co-operating with the under side of an inclined track of the sliding section, and means also carried by the sliding section and co-operating with the upper side of the track of the main section.

6. In a sliding couch bed, the combination of a main section and a sliding section, and means effective to maintain the sliding section spaced from the floor during the sliding movement thereof and to be lowered into engagement with the floor at the end of its outward sliding movement and comprising two sets of oppositely-inclined tracks carried by said sections and a plurality of means carried by said sections and co-operating with said tracks.

7. In a sliding couch bed, the combination of a main section and a sliding section, and means effective to maintain the sliding section spaced from the floor during the sliding movement thereof and to be lowered into engagement with the floor at the end of its outward sliding movement and comprising two sets of oppositely-inclined tracks carried by said sections and a plurality of means carried by said sections and co-operating with said tracks, the means of the sliding section co-operating with the tracks of the main section for maintaining the sliding section off the floor during the outward sliding movement thereof and the means of the main section co-operating with the tracks of the sliding section for maintaining said sliding section off the floor during the inward sliding movement thereof.

Signed at Boston, Mass., this 25th day of February, 1929.

PERCIVAL P. BEBRY.